United States Patent

[11] 3,624,487

| [72] | Inventor | Louis H. Segall<br>Sidney, N.Y. |
|---|---|---|
| [21] | Appl. No. | 853,637 |
| [22] | Filed | Aug. 28, 1969 |
| [45] | Patented | Nov. 30, 1971 |
| [73] | Assignee | The Bendix Corporation |

[54] DUAL ENERGY ELECTRICAL PULSE GENERATING SYSTEM
8 Claims, 1 Drawing Fig.

[52] U.S. Cl.................................................... 321/15,
315/209 CD
[51] Int. Cl.................................................... H02m 7/00
[50] Field of Search.......................................... 307/109,
110; 320/1; 321/15; 315/209 CD

[56] References Cited
UNITED STATES PATENTS

| 2,497,307 | 2/1950 | Lang | 315/209 CD |
| 2,799,809 | 7/1957 | Lautenberger | 321/15 X |
| 3,299,339 | 1/1967 | Laudon | 320/1 |

*Primary Examiner*—William M. Shoop, Jr.
*Attorneys*—Raymond J. Eifler and Plante, Hartz, Smith & Thompson ABSTRACT: A dual energy circuit for selectively generating high or low energy electrical pulses for supplying a spark gap or other load. The circuit employs a source of power comprising a power transformer and voltage doubling means to charge condensers of different capacities, and switching from one energy system to the other is effected in the high energy condenser charging path at low current.

PATENTED NOV 30 1971 3,624,487
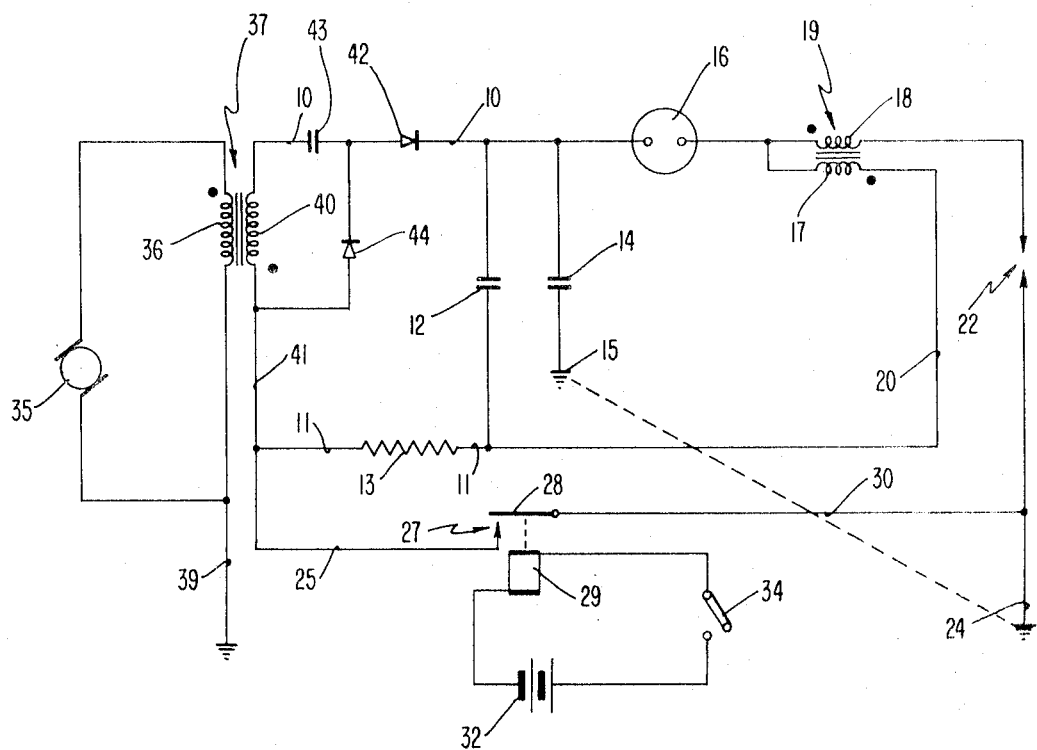
INVENTOR.
LOUIS H. SEGALL
BY
*Bauer and Seymour*
ATTORNEYS

DUAL ENERGY ELECTRICAL PULSE GENERATING SYSTEM

This invention relates to an electrical circuit which may be used, for example, to supply electrical energy pulses to igniter gaps in engine ignition systems or the like.

One of the objects of the invention is to provide a novel electrical pulse generating system which may be adapted for use in a novel manner for alternatively generating pulses of different energy levels.

The invention has among its objects the provision of a dual energy exciter circuit which employs economical standard components.

Another object is the provision of a dual energy exciter circuit which employs a single source of condenser charging power, such as a source comprising a single primary circuit for a transformer.

A further object is the provision of a circuit of the type indicated wherein the switching from one system to the other is done with low current passing through the switch.

Yet another object is the provision of a circuit wherein switching from one energy system to the other is done in the condenser charging path for the high energy system.

Still further objects are the provision of a novel electrical pulse generating system which is simple and reliable, and operates stably over a wide range of temperatures to which it is subjected.

The above and further objects and novel features of the invention will more fully appear from the following detail description when the same is read in connection with the accompanying drawing. It is to be expressly understood, however, that the drawing is for the purpose of illustration only and is not intended as a definition of the limits of the invention.

In the drawing the sole figure is a wiring diagram of an illustrative dual energy exciter circuit in accordance with the invention.

The dual energy pulse generating system of the invention is useful, for example, for continuously supplying spark gap discharging pulses at a low energy level and relatively high frequency to a spark gap, or for selectively supplying energy to the spark gap at a higher energy level and lower frequency for limited periods of operation. The system may be used to supply the ignition requirements of a combustion engine, particularly a jet or gas turbine engine, for which higher energy sparks are required during the starting of the engine, and lower energy sparks are desirable during the normal operation of the engine.

In the system shown in the drawing, there is a condenser charging circuit having a first wire 10 and a second wire 11, such circuit being supplied with condenser charging current by means to be next described. A charging current limiting resistor 13 is interposed in wire 11, as shown. A first, smaller condenser 12 is connected across wires 10 and 11, with a first terminal thereof connected to wire 10 and a second terminal thereof connected to wire 11. A second, larger condenser 14 has a first terminal thereof connected to wire 10 and its second terminal connected to a common conductor, here shown as ground, at 15. The condensers 12 and 14 function novelly in combination in a manner to be described.

The circuit 10, 11 may be supplied with energy for charging condensers 12 and 14 from any one of a number of types of electrical energy sources. In the embodiment shown an alternating current generator 35 is connected across the primary winding 36 of a voltage step-up power transformer 37, one end of such primary winding being connected to ground at 39. The secondary winding 40 of transformer 37 has one terminal thereof connected to wire 10 of the condenser charging circuit, the other terminal of the secondary winding being connected to wire 11 by a wire 41 and resistor 13. A suitable type of voltage doubling arrangement is preferably interposed between winding 40 and condensers 12 and 14. A well known type of voltage doubling means is shown by way of example and comprises a condenser and a diode 42 connected in series in the conductor 10 and a second, oppositely polarized diode 44 connected across winding 40 and condenser 43. Another suitable type of voltage doubling means is disclosed in Loudon U.S. Pat. No. 3,299,339. The current source 35, as well as being a conventional source of alternating current such as an alternator, as shown, may be an oscillator, for example, a solid state pulse generator such as a ringing choke oscillator powered by a direct current source. Condenser 12 may be incrementally charged to a selected voltage level, in a manner well understood in the art, by the above described circuitry. The charging rate may be controlled in part by the magnitude of resistor 13.

The wire 10 extends beyond its connections to condensers 12 and 14 to a first terminal of a control gap 16 which functions as a switch in the discharge circuits for said condensers. The second terminal of gap 16 is connected to the connected first ends of the primary winding 17 and the secondary winding 18 of a high-frequency, voltage step-up transformer 19. The second end of primary winding 17 is connected by wire 20 to the wire 11 of the charging circuit and hence to one end of resistor 13 and to the second terminal of condenser 12. It will be seen that the discharge circuit, including the wire 10, the gap 16, the primary winding 17 and the wire 20, is connected across condenser 12. Thus, when condenser 12 is charged to a voltage in excess of the predetermined breakdown voltage of control gap 16, such gap ionizes and becomes conductive to discharge condenser 12 through wire 10, gap 16, primary winding 17, and wire 20. The high frequency, oscillatory discharge of condenser 12 through primary winding 17 induces a high voltage in secondary winding 18, thereby to ionize and produce a relatively low energy spark discharge across the electrodes of a spark or igniter gap 22 which is interposed in series with winding 18 in a circuit comprising common conductor 24, 15, condenser 14 and the then ionized gap 16. Such spark generating action is repeated at relatively rapid intervals upon successive rechargings of condenser 12 to the spark-over voltage of control gap 16. The spark rate may be varied by varying the resistance 13. During such operation of the system, the condenser 14 does not get charged by source 35,37 but acts as a high frequency bypass in series with gap 16 for the pulses induced in secondary winding 18 of the high frequency transformer 19.

When it is desired that the system shall operate at a higher output or sparking energy level, the second or ground terminal of condenser 14 is connected to energy source through ground and wire 41 by a selectively operated switch, thereby connecting condenser 14 in a charging circuit in parallel with the series connected condenser 12 and resistor 13. In such condition of the circuit, condensers 12 and 14 are charged simultaneously to the threshold voltage of control gap 16, thereby greatly increasing the available discharge or output energy of the system. The switch is preferably disposed in the charging circuit for condenser 14 and therefore is required to handle only a relatively low current.

In order to provide for such switching of the system from one output energy level to the other, there is provided the following means. A wire 25, connected to the wire 11, extends to one contact of a switch 27. The movable contact 28 of switch 27, which may be normally biased to open position as shown, is connected by a wire 30 to one terminal of igniter gap 22 and to the low potential terminal of condenser 14 through ground 24, 15 or directly, if desired. Contact 28 may, by way of example, be actuated to and held in closed position by a solenoid 29 which may be selectively energized to close switch 27 by the closing of a circuit from a battery 32 through the coil of the solenoid by a switch 34. The switch 27 may, of course, be of any suitable known construction, such as solid state, and may be manually or automatically power actuated or controlled. If desired, switch 27 may be normally closed rather than normally open as assumed for purposes of the present description.

It will be apparent that upon the closing of switch 27, the second or low potential terminal of high energy condenser 14 is connected to the source of energy by way of ground 15, 24, wire 30, switch 27, and wire 25. There is thus provided a return path for the charging currents for condenser 14, so that both condensers 12 and 14 are connected in parallel to be simultaneously and repetitively charged. Whenever the charge on condenser 12 attains the breakdown voltage of gap 16, it discharges through primary winding 17, as described above, inducing a sufficient voltage across secondary winding 18 to ionize gap 22 and render the same conductive to the oscillatory discharge of the higher energy condenser 14 in a discharge circuit comprising gap 16, winding 18, spark gap 22 and ground 24, 15. Thus, high energy sparks are provided at gap 22 such as may be required for starting an engine. The high energy sparking rate or frequency is considerably lower than for low energy operation since the time required for simultaneously charging both condensers 12 and 14 is greater than that required for charging only the smaller condenser 12. Upon the opening of switch 27, the system turns to its low output energy state as heretofore described.

Illustrative nonlimiting values of some of the components of a circuit suitable for use as a jet engine ignition system are as follows:

Condenser 12–0.1 mfd.
Condenser 14–1.5 mfd.
Control Gap 16–1500 v. breakdown
Resistor 13–2.2 Kilohm The charging resistor 13 can be selected to control the spark rate of the system at both energy levels. The described system has been operated at temperatures of from −65° F. to +250° F. with uniformly good results. By way of example, one successful system powered by a DC battery driven solid state ringing choke oscillator and operating at its low energy level produced 15 sparks/sec. at an input voltage of 10 v. DC. Operating in its high energy mode the same system produced 1.0 spark/sec. at an input voltage of 10 v. DC.

Although only one embodiment of the invention has been illustrated in the accompanying drawing and described in the foregoing specification, it is to be expressly understood that various changes, such as in the types of specific components used and in the suggested values of the components, as well as in the suggested use of the apparatus of the invention, may be made without departing from the spirit and scope of the invention, as will now be apparent to those skilled in the art. Although condenser 14 has a markedly larger capacity than condenser 12 in the described embodiment, in some installations it may be desired that condenser 14 shall have a capacity equal to or less than that of condenser 12.

The embodiments of the invention in which an exclusive property or privilege is claimed are defined as follows:

1. Electrical apparatus comprising a source of electrical energy, a first condenser connected across said source to be charged thereby, a transformer having primary and secondary windings, a control spark gap for controlling the discharge of said condenser, means connecting said primary winding and spark gap in series across said condenser, a second condenser, an igniter gap, means connecting said spark gap, the secondary winding and the igniter gap in series across said second condenser, a selectively operable switch means, and means for connecting said switch means and the second condenser in series across said source whereby to selectively charge the second condenser in parallel with the first condenser when the switch means are closed.

2. Electrical apparatus as defined in claim 1 wherein said spark gap, secondary winding, igniter gap and switch means are connected in series across said first condenser when the switch means are closed.

3. Apparatus according to claim 1, wherein the source electrical energy comprises means supplying an alternating current and rectifying means whereby to supply the condensers with unidirectional electrical pulses.

4. Apparatus according to claim 1, wherein the second condenser has a capacity which markedly exceeds that of the first condenser.

5. Apparatus according to claim 1, comprising a current limiting resistor connected in series with the first condenser across the source.

6. Electrical apparatus comprising a source of electrical energy, a first condenser connected across said source to be charged thereby, a transformer having primary and secondary windings, a control gap for controlling the discharge of said condenser, said gap and primary winding being connected in series across said condenser, a spark gap having a spark-over voltage in excess of the spark-over voltage of the control gap, a second condenser, said gaps and second condenser being connected in series across said secondary winding to form a high frequency circuit for the energy induced in the secondary winding by the discharge of the first condenser through the control gap and primary winding, and selectively operable switch means for connecting said second condenser across said source in parallel with the first condenser and for connecting the first condenser in series with said control gap and secondary winding across said spark gap.

7. Apparatus as defined in claim 6, wherein said gaps and secondary winding are connected in series across said condensers in parallel when the switch means are closed.

8. Apparatus as defined in claim 7, wherein the second condenser has a greater capacitance than the first condenser.

* * * * *